United States Patent
Blom et al.

(10) Patent No.: US 8,661,243 B2
(45) Date of Patent: Feb. 25, 2014

(54) STORING AND FORWARDING MEDIA DATA

(75) Inventors: Rolf Blom, Jarfalla (SE); Karl Norrman, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 353 days.

(21) Appl. No.: 12/997,924

(22) PCT Filed: Jun. 16, 2008

(86) PCT No.: PCT/EP2008/057551
§ 371 (c)(1),
(2), (4) Date: Dec. 14, 2010

(87) PCT Pub. No.: WO2009/152846
PCT Pub. Date: Dec. 23, 2009

(65) Prior Publication Data
US 2011/0107082 A1   May 5, 2011

(51) Int. Cl.
*H04L 29/06* (2006.01)
(52) U.S. Cl.
USPC ........................................... 713/153; 713/160
(58) Field of Classification Search
USPC ................................................... 713/153, 160
See application file for complete search history.

(56) References Cited

U.S. PATENT DOCUMENTS

| 2005/0108746 | A1  | 5/2005 | Futagami |
| 2005/0198499 | A1* | 9/2005 | Salapaka et al. ............ 713/160 |
| 2005/0216731 | A1* | 9/2005 | Saito et al. .................. 713/153 |
| 2008/0187134 | A1* | 8/2008 | Nourry et al. ................ 380/29 |

FOREIGN PATENT DOCUMENTS

| WO | 2006045033 A | 4/2006 |
| WO | 2007002340 A | 1/2007 |

OTHER PUBLICATIONS

Kim, JoongMan, et al. "Implementation and evaluation of SIP-based secure VoIP communication system." Embedded and Ubiquitous Computing, 2008. EUC'08. IEEE/IFIP International Conference on. vol. 2. IEEE, 2008.*

* cited by examiner

*Primary Examiner* — Kambiz Zand
*Assistant Examiner* — Michael Guirguis
(74) *Attorney, Agent, or Firm* — Rothwell, Figg, Ernst & Manbeck, P.C.

(57) ABSTRACT

A method apparatus for storing and forwarding media data in a communication network. An intermediate node disposed between a media data source node and a client node receives encrypted media data packets from the media data source node. The intermediate node stores the received media data packets in a memory for later sending to the client node, and adjusts fields in the original header of each stored media data packet to create modified media data packets having a modified header, and sends adjustment information to the client node. The adjustment information allows the client node to recreate the original headers from the modified headers, before decrypting the encrypted media packets with keying materials already sent between the media data source node and the client node. The modified media data packets are then sent to the client node for decryption. This allows the intermediate node to "store and forward" SRTP data without being able to access the encrypted data content.

9 Claims, 4 Drawing Sheets

STORING AND FORWARDING MEDIA DATA

CROSS-REFERENCE TO RELATED APPLICATION

This application is a 35 U.S.C. §371 National Phase Entry Application from PCT/EP2008/057551, filed Jun. 16, 2008, and designating the United States.

TECHNICAL FIELD

The invention relates to the field of storing and forwarding media data.

BACKGROUND

Real-time Transport Protocol (RTP) is a format for delivering audio and video media data over a packet switched network. RTP is used for transporting real-time media data, such as interactive audio and video. It is therefore used in applications such is IPTV, conferencing, Voice over IP (VoIP).

Secure Real-time Transport Protocol (SRTP), specified in IETF RFC 3711, is a transport security protocol that provides a form of encrypted RTP. In addition to encryption, it provides message authentication and integrity, and replay protection, in unicast, multicast and broadcast applications. SRTP is used to protect content delivered between peers in an RTP session. SRTP is a transport security protocol and it is only intended to protect data during transport between two peers running SRTP. In particular, it does not protect data once it has been delivered to the endpoint of the SRTP session. In addition, the sending peer provides the protection by way of encryption of the media data, in other words it is assumed that the sending peer has knowledge of all keying material and is the one applying the protection of the data.

RTP is closely related to RTCP (RTP control protocol), which can be used to control the RTP session, and similarly SRTP has a sister protocol, called Secure RTCP (or SRTCP). SRTCP provides the same security-related features to RTCP as the ones provided by SRTP to RTP.

Utilization of SRTP or SRTCP is optional to utilization of RTP or RTCP; but even if SRTP/SRTCP are used, all provided features (such as encryption and authentication) are optional and can be separately enabled or disabled. The only exception is the message authentication feature, which is indispensably required when using SRTCP.

Key management for SRTP and SRTPC may be performed independently of each other, and so different encryption material may be used for each protocol. The confidentiality protection in both SRTP and SRTCP applies to the signalling payload, whereas the integrity protection covers both the payload and the metadata contained in each packet header.

Many content delivery systems are based on store and forward mechanisms, and require end-to-end confidentiality protection of media even where an intermediate node handles the data. Two typical examples are:

1. A networked media server for prime content, which requires end-to-end media protection. The media server allows the user to perform fast forward and rewind operations on the media stream.

2 A network telephone answering machine that supports end-to-end protection.

For the above scenarios, it is impossible to use SRTP for media protection, because of the design of the protection mechanisms. The confidentiality and integrity protection mechanisms (such as the formation of the Initialization Vector, IV, which is a block of bits used in conjunction with keying materials to prevent a data unit that is identical to a previous data unit from producing the same ciphertext when encrypted.) depend on certain parameters in the RTP packet header. This means that at least these values have to remain the same if a client should be able to decrypt and check integrity protection when forwarding a SRTP stream. Furthermore, if integrity protection is applied it is impossible to change even a single bit in headers and payloads when resending them from an intermediate node. This means that SRTP has to be resent by the intermediate node exactly as received, which would make fast forward and rewind operations impossible as the RTP sequence must have a monotonically increasing sequence number, SEQ, for each RTP packet.

SUMMARY

The inventors have realised the problems associated with the prior art, and in particular the problems associated with storing and forwarding SRTP data. A new protocol is required that allows an intermediate node such as a Streaming Server or a network answering machine to store and subsequently resend SRTP data using an independent RTP session without having to decrypt and re-encrypt the media. In many cases, the sending and receiving peers do not trust the intermediate node, and so it should not have access to the plaintext data in any case.

According to a first aspect of the invention, there is provided a method of storing and forwarding media data in a communication network. An intermediate node disposed between a media data source node and a client node receives encrypted media data packets from the media data source node. The intermediate node stores the received media data packets in a memory for later sending to the client node. The intermediate node adjusts fields in the original header of each stored media data packet to create modified media data packets having a modified header, and sends adjustment information to the client node. The adjustment information allows the client node to recreate the original headers from the modified headers before using information in the original headers to decrypt the encrypted media packets with keying materials already sent between the media data source node and the client node. The modified media data packets are then sent to the client node for the client node to recreate the original header fields and decrypt in order to render the media. This allows the intermediate node to "store and forward" SRTP data without being able to access the encrypted data content.

Optionally, the fields are selected from any of a sequence number, a time stamp, a Roll-Over Counter, a profile defined marker bit, and an indication of an extension field, as these fields may be required to reconstruct the proper sequence of the media data packets.

As an option, the media data is a SRTP media stream. In this case, the media data source node and the client node have access to keying materials associated with the SRTP media session between the media data source node and the client node, allowing the client node to decrypt to received SRTP packets.

In an optional embodiment, the adjustment information includes an offset value for a timestamp and an offset value for a sequence number, and an offset value for a Roll-Over Counter.

The adjustment information is optionally sent in one of a RTP message, a RTSP command message, and an expansion field in an RTP header.

According to a second aspect of the invention, there is provided a method of handling media data at a client node. A secure media session is set up between the client node and a media data source node, such that both the media data source node and the client node have access to keying materials associated with the media session. The media is sent via an intermediate node, which sends adjustment information to the client node. The client node then receives the encrypted media data packets relating to the media session from the intermediate node. The client node modifies headers in the received media data packets using the received adjustment information, such that the modified headers correspond to original headers of media data packets sent from the media data source node to the intermediate node. The client node can then use the keying materials to decrypt the media data packets. In this way, the intermediate node cannot access the encrypted media content in the media data packets.

As an option, the method includes sending to the intermediate node a request for the intermediate node to send media packets that are not in sequence with previously received packets. This allows the client node to request "rewind" and "fast forward" operations of the intermediate node.

According to a third aspect of the invention, there is provided an intermediate node for use in a communication network. The intermediate node is provided with a receiver for receiving encrypted media data packets from a media data source node, and a memory at which the received media data packets can be stored. A processor is provided for adjusting fields in the original header of each stored media data packet to create modified media data packets having a modified header. A first transmitter is arranged to send adjustment information to a client node, which allows the client node to recreate the original header from the modified header before using information in the original headers to decrypt the encrypted media packets. A second transmitter is arranged for sending the modified media data packets to the client node. Whilst the intermediate node can modify headers in the media packets, it cannot access the encrypted content of the media packets. As an option, the adjustment information comprises an offset value for a timestamp, an offset value for a sequence number, and an offset value for a Roll-Over Counter.

According to a fourth aspect of the invention, there is provided a client node for receiving media data. The client node is provided with a first receiver for receiving from a media data source node keying materials relating to a secure media data session. A second receiver is provided for receiving, from an intermediate node, adjustment information relating to encrypted media data packets sent as part of the secure media data session. A third receiver is arranged to receiving, from the intermediate node, encrypted media data packets relating to the media session. The client node uses a first processor to modify headers in the received media data packets using the received adjustment information. The modification ensures that the modified headers correspond to original headers of the media data packets sent from the media data source node to the intermediate node. A second processor is provided for decrypting the media data packets having the modified headers using the keying materials.

As an option, the client node is provided with a transmitter for sending to the intermediate node a request for the intermediate node to send media packets that are not in sequence with previously received packets, allowing the client node to receive "fast forward" or "rewind" data packets.

DETAILED DESCRIPTION

Figure 1:
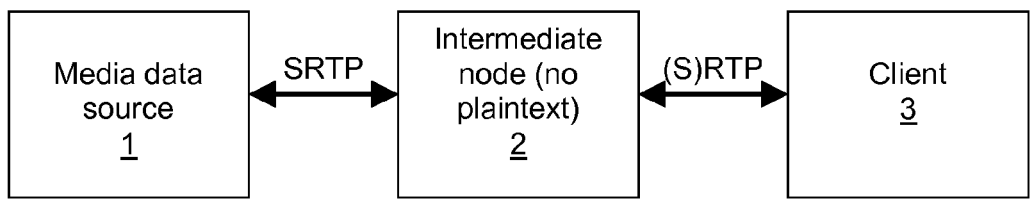
FIG. 1 illustrates schematically in a block diagram signalling and network architecture according to an embodiment of the invention.
Figure 2:
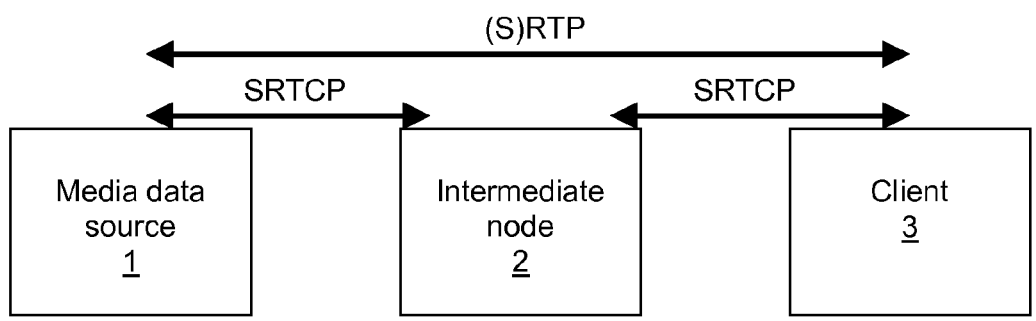
FIG. 2 illustrates schematically in a block diagram signalling and network architecture for a trust model according to an embodiment of the invention.

A new protocol, termed Storable SRTP (S-SRTP) is proposed. The main idea behind S-SRTP is to define a protocol which allows a streaming server/answering machine to resend received SRTP protected media data using an independent RTP session (i.e. using new session parameters), without having to decrypt and re-encrypt the media data or have any access to the plaintext media data. The situation considered is illustrated in FIG. 1 and the trust model is shown in FIG. 2.

A media data source 1 sends encrypted media data to an intermediate node 2, such as a Streaming Server, using SRTP. The intermediate node 2 should not be able to access the plaintext media data. The intermediate node 2 then sets up a further session (either SRTP or RTP) with a Client 3. As illustrated in FIG. 2, whilst different SRTCP sessions are established between the media data source 1 and the intermediate node 2, and the intermediate node 2 and the Client 3, the intermediate node 2 does not have access to the plaintext media data and so the trust model assumes that the (S)RTP session is established between the client 3 and the media data source 1.

S-SRTP allows forwarding of SRTP protected packets received at the intermediate node 2 in a new independent RTP session between the intermediate node 2 and the client 3 by informing the client 3 of an offset in time and data packet sequence number between the fields in a forwarded packet header and the fields in the original packet header. The client 3 uses this information to calculate the correct values of the original packet header. The client 3 also checks the integrity of the packets and decrypts the payload in the same way as it would have done if it had received the original SRTP stream directly.

If the client 3 requests time skipping such as fast forwarding or rewinding of the media content, new offset values are signalled from the intermediate node 2 to the client 3. This required because, if a client issues a RTSP rewind command to the server, the RTP sequence numbers, RTP timestamps, etc. of the original RTP media stream would not be decreased. Rather, the same payloads would be replayed, but with new (different) RTP headers. This causes a failure in synchronization between the intermediate node 2 and the client 3.

Of course, as SRTP (and consequently S-SRTP) is a secure protocol that sends encrypted media data, key management is required between the intermediate node 2 and the client 3. Known methods of key management can be used to handle this aspect of the signalling.

Consider an example scenario in which the media data source 1 sends standard SRTP media data and standard SRTCP packets to a store and forward Streaming Server acting as an intermediate node 2. The media data source 1 applies independent keying for SRTP and SRTCP and distributes the SRTCP keying material to the Streaming Server 2, which enables use of standard control signalling between the RTP sender and receiver. The actual key management protocol for independent keying of SRTP and SRTCP may be introduced by adding a new simple payload to, for example, "MIKEY". The keying material for SRTP is sent from the media data source 1 to the end-user Client 3, and not to the Streaming Server 2. The Streaming Server 2 therefore cannot decrypt the received media data or check its integrity.

When the Streaming Server 2 receives SRTP packets from the media data source 1, for each packet it records the SRTP header information, its payload and relevant SRTP fields. The recording of the header information can be optimized by noting that most fields are static for a RTP session. The header fields that vary are the RTP sequence number (SEQ) and the timestamp. The M-bit and X-bit may vary as they are used for signalling on a per packet basis. The M-bit is a profile-defined marker bit, and the X-bit indicates if an extension field is present in the packet header.

The SRTP SEQ, together with a Roll-Over Counter (ROC), forms value called the index. The index is an SRTP packet sequence number used for synchronization of the encryption and integrity transforms and replay protection. The index must be implicitly or explicitly recorded by the Streaming Server 2.

When the Streaming Server 2 resends media data packets to the Client 3, it constructs a new SRTP stream in an independent RTP session with the payload and corresponding SRTP fields derived from the original SRTP packets. Examples of the corresponding SRTP fields include the authentication tag and the Master Key Identifier (MKI). Static header information may be chosen freely by the Streaming Server 2, but in order to maintain synchronization, the varying fields in each packet header sent to the Client 3 must be related to the corresponding fields in the original packets. In particular the M and the X bits have to be the same while the SEQ and the timestamp must be such that they have a constant additive offset with respect to the corresponding values in the original packets. Extension headers must also be exactly the same as in the original packet, both to enable integrity protection and to ensure correct operation.

The Streaming Server 2 then sends the information that the Client 3 requires in order to derive the original SRTP header and ROC values used to derive the original SRTP security context. The information sent is the offset for the timestamp, the offset for the index giving the start value for ROC, and the offset for SEQ. The original content of the static fields can be sent directly as they were or as, for example, XOR offsets to the used values. Consider the example where the original stream was using a Synchronization Source identifier (SSRC) of 0xffff, and the Streaming Server wishes to use an SSRC of 0x8888, the SSRC offset would be 0x7777.

The offset information may be sent to the Client 3 using RTCP. Alternatively, when the rendering of the media content is controlled via RTSP, the offset information may be sent in a response to RTSP commands. In a further alternative, the offset information is sent to the Client 3 in an expansion field in the RTP header. Note that in this case, the expansion header must be removed before the Client 3 checks the integrity of each RTP packet.

If no integrity protection is applied the S-SRTP receiver only needs the original values for header fields that are used as input for IV creation. This might reduce the amount of offset information that has to be sent from the streaming server to the client.

Figure 3:
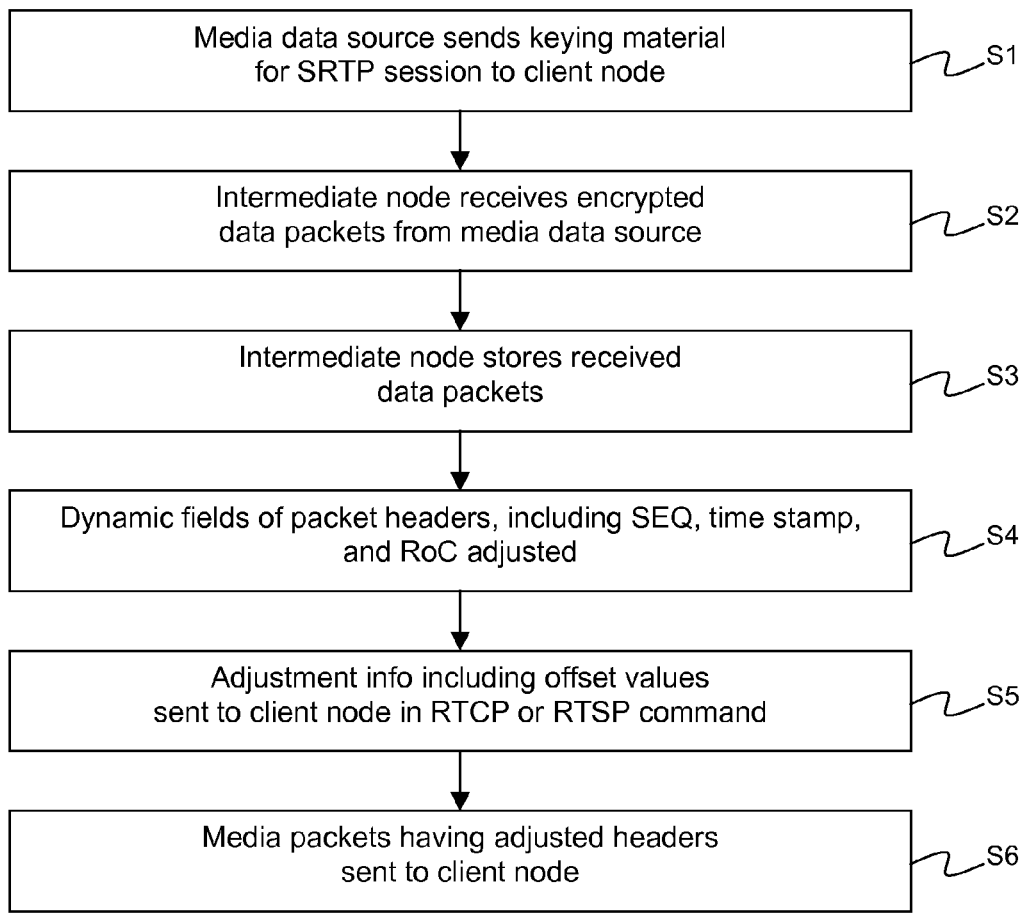
FIG. 3 is a flow diagram illustrating the main steps according to an embodiment of the invention.

Referring to FIG. 3, there is shown a flow diagram illustrating the basic steps of an embodiment of the invention. The following numbering corresponds to the numbering of FIG. 3:

S1. The media data source 1 sends keying material to the Client node 3 for an SRTP media session.

S2. The media data source 1 sends encrypted media data packets to the intermediate node 2.

S3. The intermediate node 2 stores the received encrypted data packets.

S4. The intermediate node 2 makes offset adjustments values in the dynamic header fields in the stored media packets, such as the SEQ, time stamp and ROC, as described above. Note that the intermediate node 2 may also make changes to static header fields.

S5. Information used to make the adjustments is sent to the client node 3 either using RTCP signalling, an RTSP command, or an RTP expansion header.

S6. The media data packets having modified headers are sent to the client node 3.

Figure 4:
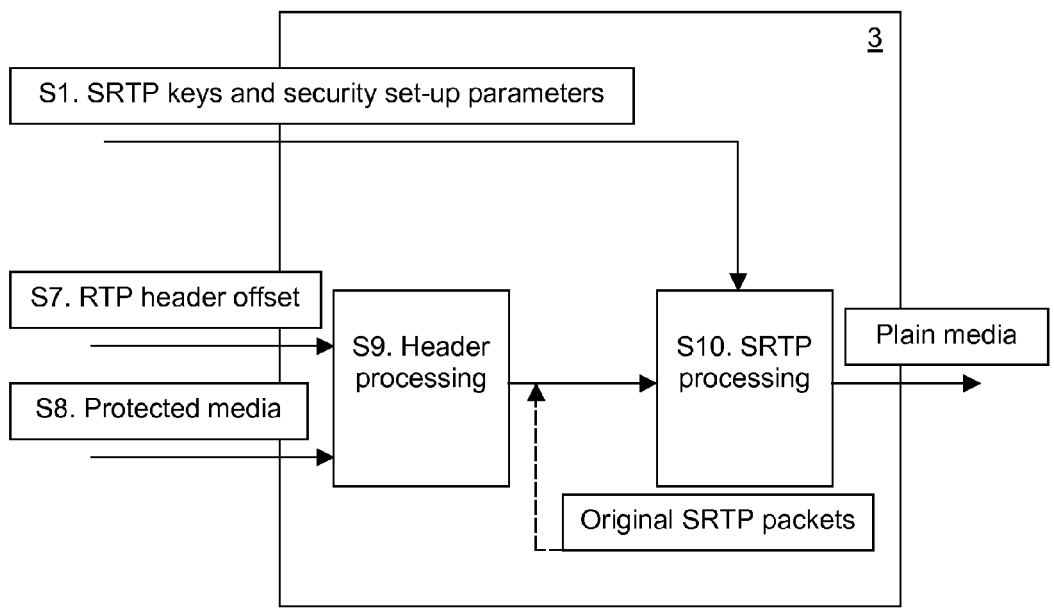
FIG. 4 illustrates schematically in a block diagram processing steps at a receiving node according to an embodiment of the invention.

Turning now to FIG. 4, there are shown processing steps at the client node 3 according to an embodiment of the invention. The following numbering corresponds to the numbering in FIGS. 3 and 4:

S1. The client node 3 receives the keying material from the media data source 1.

S7. The client node 3 subsequently receives adjustment information from the intermediate node 2, the adjustment information relating to dynamic and static fields in media data packet headers.

S8. The client node receives data packets from the intermediate node 2.

S9. The client node 3 uses the adjustment information to modify the media packet headers to recreate the headers of the media packets originally sent from the media data source 1 to the intermediate node 2.

Figure 5:
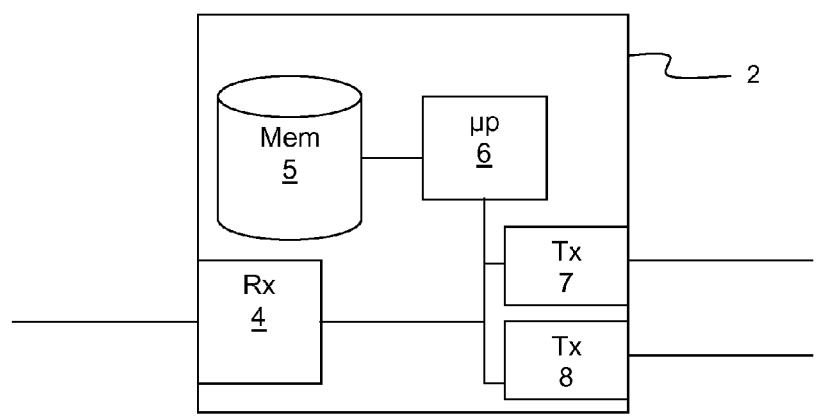
FIG. 5 illustrates schematically in a block diagram in intermediate node according to an embodiment of the invention.

S10. The client node decrypts the media data packets and perfume normal media data handling procedures, such as passing the decrypted media data to a media rendering function An intermediate node 2 such as a store and forward Streaming server is shown in FIG. 5. The intermediate node 2 comprises a receiver 4 for receiving encrypted media data packets from the media data source node 1. The intermediate node is also provided with a memory 5 for storing the received packets. A processor 6 is further provided for offsetting the dynamic fields in the original header of each stored media data packet, as described above. A first transmitter 7 is provided for sending the information used for making the offset to the client node, and a second transmitter 8 is provided for sending the adjusted packets to the client node 3.

Figure 6:
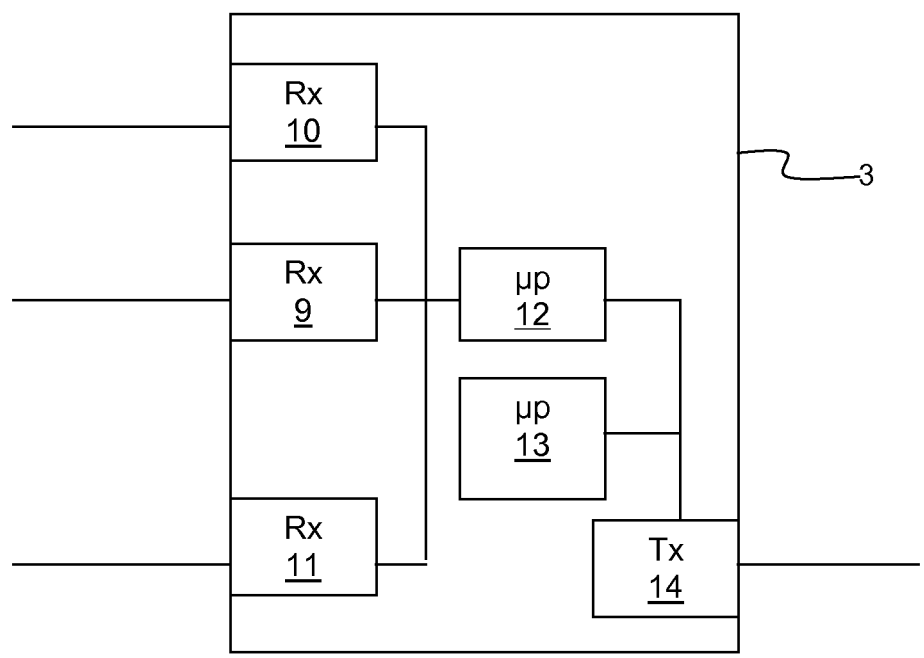
FIG. 6 illustrates schematically in a block diagram a client node according to an embodiment of the invention.

A Client node 3, as illustrated in FIG. 6, comprises a first receiver 9 for receiving keying materials and setup information from the media data source node 1. A second receiver 10 is provided for receiving adjustment information used to offset header fields from the intermediate node 2. A third receiver 11 is also provided for receiving encrypted media data packets from the intermediate node 2. A first processor 12 is used to modify headers in the received media data packets using the received adjustment information, in order to ensure that that the modified headers correspond to original headers of media data packets sent from the media data source node 1 to the intermediate node 2, as described above. A second processor 13 is also provided for decrypting the media data packets having the modified headers, using the keying materials. A transmitter 14 may be provided for sending messages to the intermediate node 2, such as requests to fast forward or rewind the media stream, or skip to a different section of the media stream.

The invention provides a method and apparatus for resending of SRTP streamed media data in an S-SRTP stream in an independent RTP session, where an intermediate node 2 does not have access to the plaintext content of the media data. Time adjustment such as fast forward and fast rewind of stored SRTP protected content is provided for, and the invention has a minimal impact on existing SRTP protocols.

It will be appreciated by the person of skill in the art that various modifications may be made to the above-described embodiments without departing from the scope of the present invention.

The following abbreviates are used in the above description:

CTR CounTeR mode
IV Initialization Vector
IVSN IV Sequence Number
NONCE Number used ONCE
ROC Roll-Over Counter
RTCP RTP Control Protocol
RTP Real-time Transport Protocol
SRTP Secure Real-Time transport Protocol
SRTCP SRTP Control Protocol
SSRC Synchronization SouRCe

The invention claimed is:

1. A method for storing and forwarding media data, comprising:
   an intermediate node receiving a first media data packet transmitted from a source node using a first session established between the source node and the intermediate node, the media data packet comprising a media data payload portion containing payload data and a first header comprising a first header field storing a first header value and a second header field storing a second header value;
   the intermediate node obtaining an offset value;
   the intermediate node sending the offset value to a client node;
   the intermediate node calculating a third header value using said second header value and said offset value, wherein said offset value equals a difference between the second header value and said third header value;
   the intermediate node creating a second media data packet comprising a media data payload portion containing said payload data and a second header, the second header comprising a first header field storing said first header value and a second header field storing said third header value;
   the intermediate node sending the second mead data packet to the client node using a second session established between the intermediate node and the client node, wherein the second session is separate and distinct from the first session.

2. The method of claim 1, wherein the second header field of the first media data packet is a sequence number field and the second header field of the second media data packet is a sequence number field.

3. The method of claim 2, wherein
   the first header further comprises a timestamp field storing a first timestamp value,
   the method further comprises: (a) the intermediate node obtaining a timestamp offset value; (b) the intermediate node sending the timestamp offset value to the client node; and (c) the intermediate node calculating a second timestamp value using said first timestamp value and said timestamp offset value, wherein said timestamp offset value equals a difference between the first and second timestamp values, and
   the second header further comprises a timestamp field storing said second timestamp value.

4. The method of claim 2, wherein
   the first header further comprises a roll-over counter field storing a first roll-over counter value,
   the method further comprises: (a) the intermediate node obtaining a roll-over counter offset value; (b) the intermediate node sending the roll-over counter offset value to the client node; and (c) the intermediate node calculating a second roll-over counter value using said first roll-over counter value and said roll-over counter offset value, wherein said roll-over counter offset value equals a difference between the first and second roll-over counter values, and
   the second header further comprises a roll-over counter field storing said second roll-over counter value.

5. A method performed by an client node for processing media data packets received from an intermediate node that store and forwards media data packets, comprising:
   the client node receiving keying material from a media data source;
   the client node receiving from the intermediate node a first media data packet comprising a media data payload portion containing encrypted payload data and a header comprising a first header field storing a first header value and a second header field storing a second header value;
   the client node receiving from the intermediate node an offset value;
   the client node calculating a third header value using said second header value and said offset value, wherein said offset value equals a difference between the second header value and said third header value;
   the client node creating a second media data packet comprising a media data payload portion containing said encrypted payload data and a second header comprising a first header field storing said first header value and a second header field storing said third header value, wherein the second media data packet is identical to a media data packet received by the intermediate node from the media data source.

6. The method of claim 5, further comprising:
   the client node checking the integrity of the second media data packet; and
   the client node using the keying information to decrypt the encrypted payload data.

7. The method of claim 5, wherein the second header field of the first media data packet is a sequence number field and the second header field of the second media data packet is a sequence number field.

8. The method of claim 7, wherein
   the first header further comprises a timestamp field storing a first timestamp value,
   the method further comprises: (a) the client node receiving from the intermediate node a timestamp offset value; and (b) the client node calculating a second timestamp value using said first timestamp value and said timestamp offset value, wherein said timestamp offset value equals a difference between the first and second timestamp values, and
   the second header further comprises a timestamp field storing the second timestamp value.

9. The method of claim 7, wherein
   the first header further comprises a roll-over counter field storing a first roll-over counter value, the method further comprises: (a) the client node receiving from the intermediate node a roll-over counter offset value; and (b) the client node calculating a second roll-over counter value using said first roll-over counter value and said roll-over counter offset value, wherein said roll-over counter offset value equals a difference between the first and second roll-over counter values, and the second header further comprises a roll-over counter field storing the second roll-over counter value.

* * * * *

UNITED STATES PATENT AND TRADEMARK OFFICE
CERTIFICATE OF CORRECTION

PATENT NO. : 8,661,243 B2  
APPLICATION NO. : 12/997924  
DATED : February 25, 2014  
INVENTOR(S) : Blom et al.

Page 1 of 1

It is certified that error appears in the above-identified patent and that said Letters Patent is hereby corrected as shown below:

On the Title Page, in Item (75), under "Inventors", in Column 1, Line 1,
delete "Jarfalla" and insert -- Järfälla --, therefor.

In the Specification:

In Column 1, Line 21, delete "such is IPTV," and insert -- such as IPTV, --, therefor.

In Column 1, Line 48, delete "SRTPC" and insert -- SRTCP --, therefor.

In the Claims:

In Column 7, Line 51, in Claim 1, delete "second mead data" and
insert -- second media data --, therefor.

Signed and Sealed this  
Fifteenth Day of July, 2014

Michelle K. Lee  
*Deputy Director of the United States Patent and Trademark Office*